United States Patent
Fujii

(10) Patent No.: US 8,184,459 B2
(45) Date of Patent: May 22, 2012

(54) SWITCHING POWER SUPPLY APPARATUS

(75) Inventor: Masanari Fujii, Matsumoto (JP)

(73) Assignee: Fuji Electric Co., Ltd., Kawasaki-Shi (JP)

(*) Notice: Subject to any disclaimer, the term of this patent is extended or adjusted under 35 U.S.C. 154(b) by 519 days.

(21) Appl. No.: 12/458,918

(22) Filed: Jul. 28, 2009

(65) Prior Publication Data

US 2010/0061129 A1    Mar. 11, 2010

(30) Foreign Application Priority Data

Sep. 8, 2008   (JP) ................. 2008-229239

(51) Int. Cl.
*H02M 7/44* (2006.01)

(52) U.S. Cl. ....... 363/97; 363/21.1; 363/21.18; 323/284

(58) Field of Classification Search ................. 323/284, 285, 299; 363/21.1, 21.18, 97
See application file for complete search history.

(56) References Cited

U.S. PATENT DOCUMENTS

| | | | | |
|---|---|---|---|---|
| 6,166,925 A | * | 12/2000 | Richter et al. | 363/21.01 |
| 7,541,788 B2 | * | 6/2009 | Katoh et al. | 323/282 |
| 7,746,673 B2 | * | 6/2010 | Grant et al. | 363/21.18 |
| 8,018,743 B2 | * | 9/2011 | Wang et al. | 363/21.18 |
| 2008/0304295 A1 | * | 12/2008 | Chou | 363/21.18 |
| 2010/0061129 A1 | * | 3/2010 | Fujii | 363/127 |
| 2011/0051472 A1 | * | 3/2011 | Zhang et al. | 363/21.18 |

FOREIGN PATENT DOCUMENTS

| | | |
|---|---|---|
| JP | 2002-036915 A | 2/2002 |
| JP | 2004-304884 A | 10/2004 |
| JP | 2004-304885 A | 10/2004 |

* cited by examiner

*Primary Examiner* — Jeffrey Sterrett
(74) *Attorney, Agent, or Firm* — Manabu Kanesaka

(57) ABSTRACT

A switching power supply apparatus employing a voltage obtained by rectifying an output from an AC power supply, as an input thereof includes a switching control circuit. The switching control circuit conducts a PFM control having a fixed ON-period of a switching device when a load is judged to be light based on a load signal indicating the load, and a PWM control when the load is judged not to be light. The switching control circuit changes the ON-period based on whether the AC power supply is a high voltage system or a low voltage system.

7 Claims, 7 Drawing Sheets

SWITCHING POWER SUPPLY APPARATUS

BACKGROUND OF THE INVENTION AND RELATED ART STATEMENT

The present invention relates to switching power supply apparatuses that conduct a pulse frequency modulation control (herein after referred to as a "PFM control") and a pulse width modulation control (hereinafter referred to as a "PWM control"). Specifically, the invention relates to switching power supply apparatuses, which employ the voltage obtained by rectifying the output from an AC power supply for an input thereof and facilitate reduction of the electric power consumption under a light load and preventing the transformer thereof from buzzing.

Considering the environmental protection, it has been required for the electric and electronic instruments to reduce the electric power consumption thereof. For OA instruments provided with a standby function, it has been demanded to reduce the electric power consumed in the standby mode. Responding to the circumstances described above, it has been required for the power supply apparatuses, which feed electric power to the respective instruments, to reduce the electric power consumption in the standby mode thereof.

A conventional technique for reducing the electric power consumption of the power supply apparatuses in the standby mode thereof employs two power supply apparatuses: a power supply apparatus exhibiting a high output capacity and used in the normal mode of operation and a power supply apparatus used in the stand by mode. However, the employment of the two power supply apparatuses enlarges the occupied volume and increases the manufacturing costs. Therefore, it is difficult to obtain inexpensive and practical products by employing the two power supply apparatuses.

Conventional techniques for reducing the electric power consumption using only one power supply apparatus employ a switching power supply apparatus and lower the driving frequency (switching frequency) of the power MOSFET used for a switching device in the standby mode of operation. By one of the conventional techniques, the switching frequency is changed over to the lower one as the load current exceeds the reference value to the smaller side. (The switching frequency changes discontinuously between two frequencies). By the other conventional technique, the switching frequency is lowered in response to the load current smaller than the reference value. (The switching frequency changes continuously in response to the load current.)

FIG. 5 is a block circuit diagram of a conventional switching power supply apparatus.

In FIG. 5, the AC input from AC power supply AP1 is full-wave rectified by diode stack DS1 and DC voltage Vin obtained by smoothing the full-wave rectified voltage by capacitor C1 is fed to primary winding N1 of transformer T. MOS transistor Q1 as a switching device is connected in series to primary winding N1. Power MOS transistor Q1 conducts ON and OFF operations in response to the driving signal fed from switching control circuit 100 integrated in to an IC. In response to the ON and OFF of MOS transistor Q1, a pulsating voltage is generated across secondary winding N2 of transformer T. The pulsating voltage is rectified by diode D1 and output voltage Vout obtained by smoothing the rectified voltage by capacitor C2 is fed to load 200.

Output voltage Vout fed to load 200 is divided and detected by resistors R1, R2 and the detected value is compared with a reference voltage (not shown) in shunt regulator SR1. The result of the comparison is fed to feedback terminal FB of switching control circuit 100 as feedback signal VFB via photocoupler PC1. In other words, the current corresponding to an error signal obtained by amplifying the difference between the divide voltage value, obtained by dividing output voltage Vout by resistors R1, R2, and the reference voltage, flows through light emitting diode LED of photocoupler PC1. The light corresponding to the current flowing through light emitting diode LED impinges on phototransistor PT of photocoupler PC1. The current corresponding to the impinging light amount flows through phototransistor PT of photocoupler PC1. Since the output (collector) of phototransistor PT is pulled up by resistor R4 in switching control circuit 100, feedback signal VFB fed to feedback terminal FB becomes smaller (closer to ground potential GND) as the current flowing through phototransistor PT is larger.

Due to the circuit configuration described above, a larger current flows through phototransistor PT, and smaller feedback signal VFB is obtained as output voltage Vout becomes larger than the target voltage set by the reference voltage described above. In contrast, a smaller current flows through phototransistor PT, and larger feedback signal VFB is obtained as output voltage Vout becomes smaller than the target voltage set by the reference voltage described above. Since the current fed from the switching power supply apparatus to capacitor C2 tends to be more excessive than the current consumed in load 200 as load 200 becomes lighter, output voltage Vout becomes larger than the target voltage. Therefore, feedback signal VFB may be deemed as a load signal that indicates the load (the magnitude of the current consumed in load 200).

As a current flows through primary winding N1 of transformer T, a voltage is generated across auxiliary winding N3 of transformer T. The voltage generated across auxiliary winding N3 is rectified by diode D2, smoothed by capacitor C3 and fed to power supply terminal Vcc of switching control circuit 100.

It is impossible to feed electric power from auxiliary winding N3, when the switching operation of the switching power supply apparatus is not conducted such as at the start of the switching power supply apparatus. When it is impossible to feed electric power from auxiliary winding N3, electric power is fed directly from DC voltage Vin via VH terminal VH of switching control circuit 100 and starter circuit 101. In other words, starter circuit 101 receives energy feed from DC voltage Vin and feeds a charging current to capacitor C3 via power supply terminal Vcc. As the voltage at power supply terminal Vcc reaches a predetermined voltage, starter circuit 101 stops feeding the charging current.

Reference voltage generator circuit 102 is connected to power supply terminal Vcc. Reference voltage generator circuit 102 generates a reference voltage of 5 V. (Hereinafter, the reference voltage of 5 V will be referred to as "reference voltage 5V".) Reference voltage generator circuit 102 feeds reference voltage 5V to resistor R4 and the relevant circuits in switching control circuit 100.

The voltage across sensing resistor Rs, that is the detection signal of the current flowing through power MOS transistor Q1, is fed to current sensing terminal IS of switching control circuit 100. Ground terminal GND of switching control circuit 100 is shown in FIG. 5.

For keeping the ordinary output voltage at a certain value, the switching power supply apparatus described above monitors the output voltage, feeds back the output voltage data to the switching control circuit that drives the switching device, conducts a PWM control for adjusting the pulse width of the switching device (negative feedback control), and outputs from output terminal OUT a signal for conducting the ON-OFF drive of power MOS transistor Q1.

The switching power supply apparatus disclosed in Japanese Unexamined Patent Application Publication No. 2004-304885 (Patent Document 1) judges the load, conducts a PWM control when the load is greater than a predetermined value, and shifts the switching frequency to the lower side under a light load as the load becomes closer to zero, and further elongates the pulse width of the switching device gradually.

The switching power supply apparatus disclosed in the Patent Document 1 also changes the ON-pulse width of the switching device thereof based on DC voltage Vin under a light load and shortens the ON-pulse width, when DC voltage Vin is high, for preventing the switching power supply apparatus from buzzing.

The buzzing of the switching power supply apparatus and the countermeasures for preventing the buzzing from causing will be described below with reference to FIGS. 6 and 7.

When the magnetization energy of transformer T is large, that is when the load current flowing through load 200 is large to some extent, buzzing is caused by the switching frequency entering the audible frequency range. On the other hand, it is preferable to shift the switching frequency to the lower side under a light load as described above. Therefore, the switching frequency is set to exhibit the characteristics as described in FIG. 6.

FIG. 6 describes the switching frequency characteristics set to be optimum for the AC input voltage of 100 Vac. In FIG. 6, the horizontal axis represents the load value (in detail, a signal indicating the load current or feedback signal VFB described above) and the vertical axis represents the switching frequency. In the region designated as "Standby electric power characteristics impaired", the switching frequency is high even though the load is light. Therefore, the electric power conversion efficiency of the switching device is impaired and the standby electric power characteristics are impaired in the region designated as "Standby electric power characteristics impaired". In the region designated as "Buzzing", the switching frequency coincides with the audible frequency and the magnetization energy of transformer T is high enough to cause buzzing. In FIG. 6, the unfavorable regions described above are avoided so that the standby electric power characteristics may be prevented from being impaired and buzzing may be prevented from causing at the AC input voltage of 100 Vac.

However, as the AC input voltage is changed from 100 Vac to 200 Vac while the ON-pulse width of the switching device is unchanged, the switching frequency starts decreasing from a load value greater than the load value where the switching frequency starts decreasing in a case of the AC input voltage of 100 Vac. As a result, the switching frequency changes through the buzzing range. In short, buzzing is caused at the AC input voltage of 200 Vac.

For preventing the buzzing from causing at the AC input voltage of 200 Vac, the switching power supply apparatus disclosed in the Patent Document 1 changes the ON-pulse width of the switching device under a light load based on DC voltage Vin. By the technique described above, the ON-pulse width at the AC input voltage of 200 Vac is shortened so that the switching frequency may not be changed between the AC input voltages of 100 Vac and 200 Vac, as shown in FIG. 7.

The switching power supply apparatus disclosed in the Patent Document 1 gradually elongates the ON-pulse width of the switching device thereof under the light load, as the load becomes further lighter. As the load becomes lighter, the ON-period for one ON-state of power MOS transistor Q1 becomes longer, causing larger pulsation of output voltage Vout. Since the ON-period becomes longer as the load becomes lighter, the OFF-period becomes also very long, making the frequency extremely low. The extremely low frequency further causes response delay, when the load becomes heavy suddenly when the main switch of the load shifts from the OFF-state thereof to the ON-state thereof.

In the switching power supply apparatus disclosed in the Patent Document 1, it is assumed that DC voltage Vin is smoothed almost perfectly to be a constant voltage (cf. FIG. 3 in the Patent Document 1). Therefore, the switching power supply apparatus disclosed in the Patent Document 1 is not applicable to a switching power supply apparatus for improving the power factor (hereinafter referred to as a "PFC power supply apparatus"). For improving the power factor, it is necessary for the PFC power supply apparatus to feed a signal including the phase data of an AC power supply to the switching control circuit thereof. Therefore, a capacitor, the capacitance of which is small enough only to remove the ripples caused by the switching operation, is used for capacitor C1 shown in FIG. 5. DC voltage Vin has a positive pulsating waveform as described with reference to FIGS. 2(*a*), 2(*b*) later. It is impossible for the switching power supply apparatus disclosed in the Patent Document 1 to handle such a waveform as described above and to judge the value of DC voltage Vin.

The Patent Document 1 does not describe anything about the protection against overload including short-circuiting or the countermeasures against the overcurrent caused at the start of the switching power supply apparatus.

In view of the foregoing, it is an object of the invention to overcome the problems described above, and to provide a switching power supply apparatus that facilitates the reduction of the power consumption in the standby mode and prevents buzzing.

It is another object of the invention to provide a switching power supply apparatus that facilitates quick response to the change over from the no-load condition to the normal load condition, thereby preventing an overcurrent from causing at the start thereof, and protecting against short-circuiting.

It is a further object to provide a switching power supply apparatus applicable to a PFC power supply apparatus.

Further objects and advantages of the invention will be apparent from the following description of the invention.

SUMMARY OF THE INVENTION

According to a first aspect of the invention, there is provided a switching power supply apparatus that employs the voltage obtained by rectifying the output from an AC power supply for the input thereof. The switching power supply apparatus comprises:

a switching control circuit for conducting a PFM control, in which the ON-period of a switching device is fixed, when the a load is judged to be light based on a load signal indicating a value of the load;

wherein the switching control circuit conducts a PWM control when the load is judged not to be light, and the switching control circuit changes the ON-period of the switching device in the PFM control depending on whether the AC power supply is a high voltage system or a low voltage system.

According to a second aspect of the present invention, the switching power supply apparatus further includes a hysteresis comparator that compares the pulsating voltage of the AC power supply with a first reference voltage and with a second reference voltage lower than the first reference voltage; and the switching control circuit judges whether the AC power supply is the high voltage system or the low voltage system based on the output from the hysteresis comparator at the time when the pulsating voltage decreasing from a voltage higher than a third reference voltage between the first and second reference voltages becomes equal to the third reference voltage.

According to a third aspect of the present invention, the switching control circuit sets the ON-period of the switching device at a predetermined shortest ON-period when a predetermined condition is met in the PWM control.

According to a fourth aspect of the present invention, the shortest ON-period is shorter than the ON-period of the switching device in the PFM control.

According to a fifth aspect of the present invention, the predetermined condition includes that the load judged from the load signal is equal to or heavier than a rated load.

According to a sixth aspect of the present invention, the load signal is an error signal indicating the difference between the reference value and the detected value of the output voltage from the switching power supply apparatus.

According to a seventh aspect of the present invention, the load signal is a detection signal indicating the current flowing through the switching device.

The switching power supply apparatus according to the invention conducts a PWM control under an ordinary load. The switching power supply apparatus according to the invention conducts a pulse frequency modulation control (PFM control), in which the ON-period of the switching device is fixed, under a light load and changes the ON-period of the switching device in the PFM control depending on whether the AC power supply is a high voltage system or a low voltage system. The switching power supply apparatus according to the invention that operates as described above facilitates the reduction of the electric power consumption in the standby mode, preventing buzzing, and responding quickly to the change from the no-load state to the ordinary load state. The switching power supply apparatus according to the invention judges the peak value of the pulsating rectified voltage of the AC power supply using hysteresis comparators to further judge whether the AC power supply is the high voltage system or the low voltage system.

DETAILED DESCRIPTION OF PREFERRED EMBODIMENTS

The invention will be described in detail hereinafter with reference to the accompanied drawings which illustrate the preferred embodiments of the invention.

Figure 1:
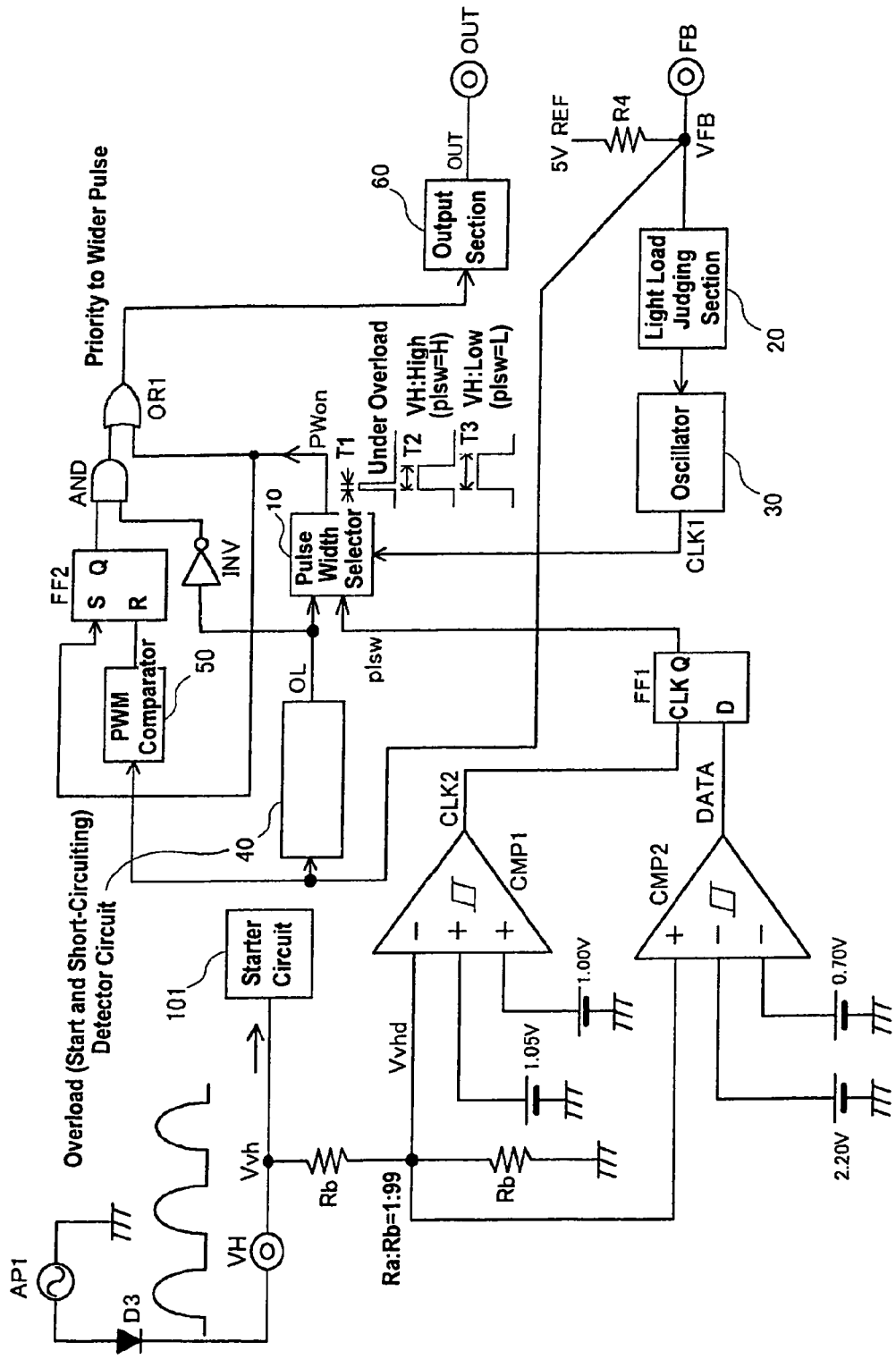
FIG. 1 is a block circuit diagram showing a switching control circuit of a switching power supply apparatus according to an embodiment of the invention.

FIG. 1 is a block circuit diagram showing the switching control circuit of a switching power supply apparatus according to an embodiment of the invention.

Figure 5:
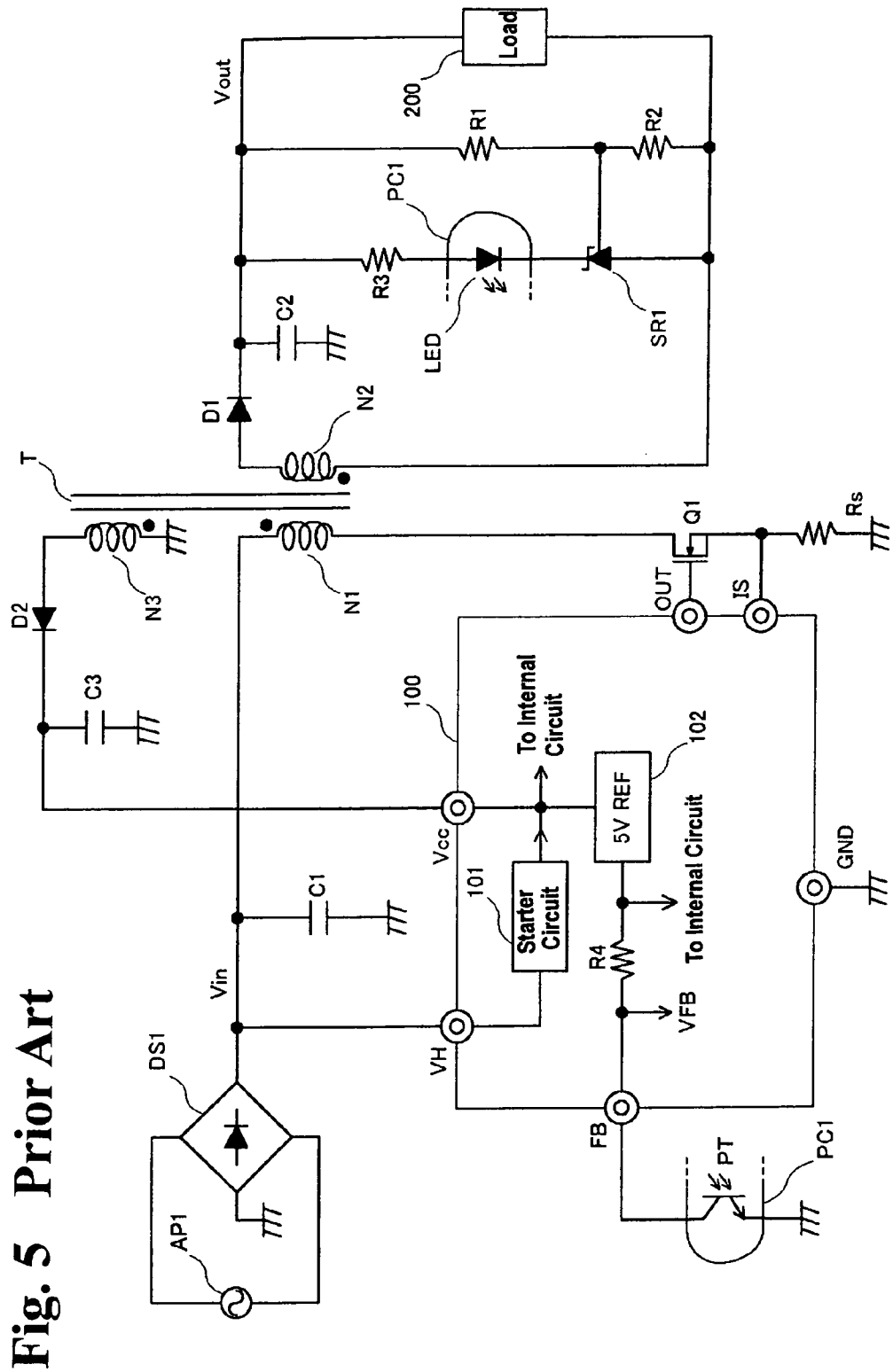
FIG. 5 is a block circuit diagram of a conventional switching power supply apparatus.
Figure 6:
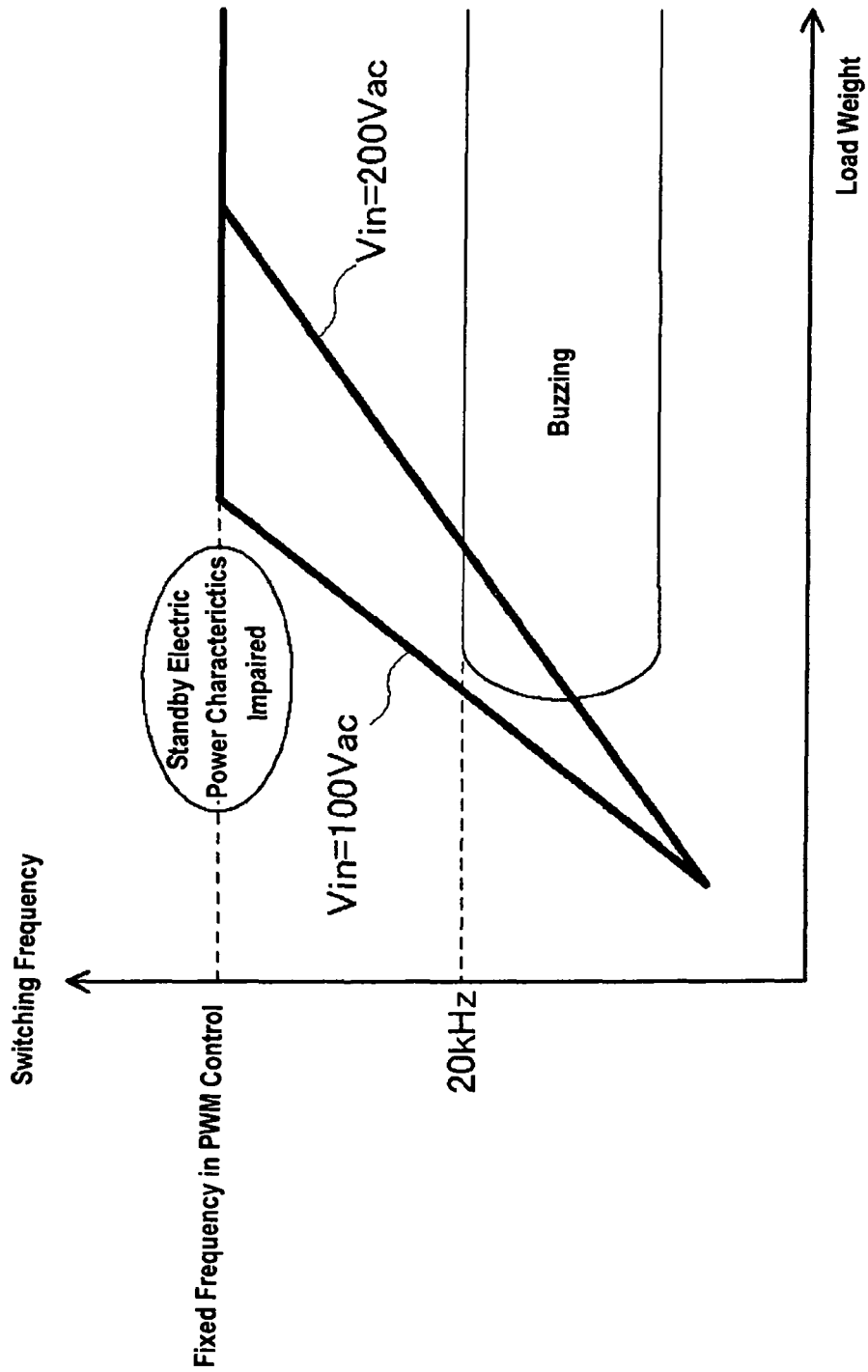
FIG. 6 is a diagram describing the relation between the load and the switching frequency when buzzing is caused in the switching power supply apparatus.
Figure 7:
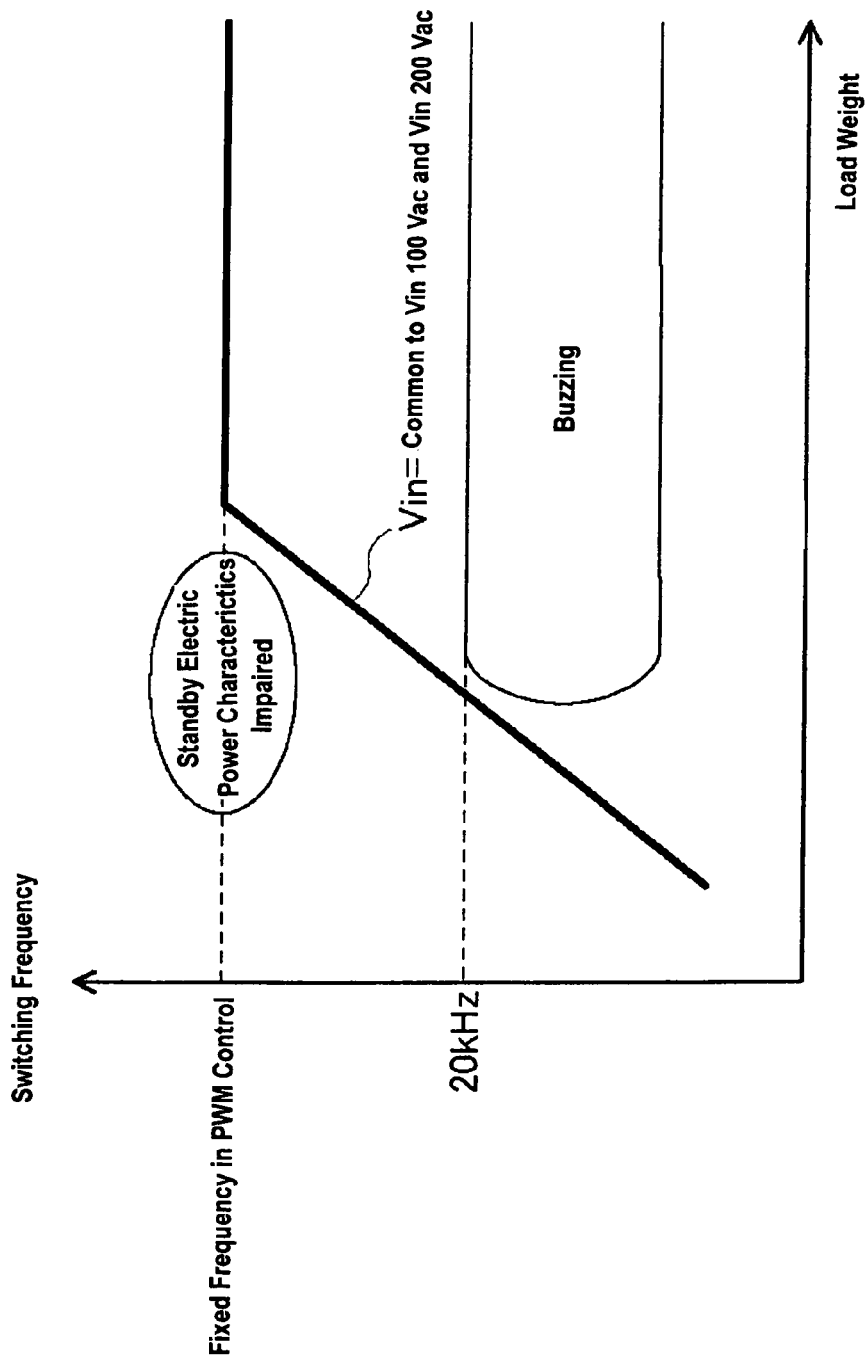
FIG. 7 is a diagram describing the relation between the load and the switching frequency when buzzing is prevented in the switching power supply apparatus.

The entire configuration of the switching power supply apparatus shown in FIG. 1 is the same as the entire configuration of the switching power supply apparatus shown in FIG. 5. An input obtained by the full-wave rectification or the half-wave rectification of an AC from AC power supply AP1 is inputted to VH terminal VH. In FIG. 5, the AC from AC power supply AP1 is full-wave rectified by diode stack DS1 and inputted to VH terminal VH. In FIG. 1, the AC from AC power supply AP1 is half-wave rectified by diode D3 and inputted to VH terminal VH. The invention is applicable to the full-wave rectification as well as to the half-wave rectification. The switching power supply apparatus according to the embodiment of the invention is considered to be a PFC power supply apparatus. Therefore, the waveform of rectified voltage Vvh inputted to VH terminal VH is a pulsating waveform as shown in FIG. 2($b$). When a full-wave rectified signal is inputted to VH terminal VH, the inputted signal has a waveform as shown in FIG. 2($a$).

In the switching control circuit, rectified voltage Vvh is inputted to starter circuit 101 and divided by resistors Ra and Rb into 1/100. Divided voltage signal Vvhd is fed to the inverting input terminal of hysteresis comparator CMP1. Two reference voltages 1.05 V and 1.00 V are fed to the non-inverting input terminals of hysteresis comparator CMP1. Hysteresis comparator CMP1 compares, when output signal CLK2 therefrom is high (hereinafter referred to as "H"), divided voltage signal Vvhd with the reference voltage of 1.05 V. Hysteresis comparator CMP1 compares, when output signal CLK2 therefrom is low (hereinafter referred to as "L"), divided voltage signal Vvhd with the reference voltage of 1.00 V. In other words, hysteresis comparator CMP1 compares divided voltage signal Vvhd with the reference voltage of 1.00 V, when divided voltage signal Vvhd decreases from a high value. Hysteresis comparator CMP1 compares divided voltage signal Vvhd with the reference voltage of 1.05 V, when divided voltage signal Vvhd increases from a low value.

Divided voltage signal Vvhd is fed also to the non-inverting input terminal of hysteresis comparator CMP2. Two reference voltages 2.20 V and 0.70 V are fed to the inverting input terminals of hysteresis comparator CMP2. Hysteresis comparator CMP2 compares, when output signal DATA therefrom is H, divided voltage signal Vvhd with the reference voltage of 0.70 V. Hysteresis comparator CMP2 compares, when output signal DATA therefrom is L, divided voltage signal Vvhd with the reference voltage of 2.20 V. In other words, hysteresis comparator CMP2 compares divided voltage signal Vvhd with the reference voltage of 0.70 V, when divided voltage signal Vvhd decreases from a high value. Hysteresis comparator CMP2 compares divided voltage signal Vvhd with the reference voltage of 2.20 V, when divided voltage signal Vvhd increases from a low value.

Signal CLK2 is fed to clock terminal CLK of D-flip-flop FF1. Signal DATA is fed to data input terminal D of D-flip-flop FF1. Due to the configuration described above, D-flip-flop FF1 reads in signal DATA at the rising front of signal CLK2. D-flip-flop FF1 feeds signal DATA read in as signal plsw from output terminal Q thereof to pulse width selector 10.

Feedback signal VFB from feedback terminal FB is fed to light load judging section 20. Light load judging section 20 judges the load from feedback signal VFB. Based on the results of the judgment, light load judging section 20 orders the frequency of clock CLK1 that determines the switching frequency to oscillator 30. In detail, when light load judging section 20 judges from feedback signal VFB that the load is greater than a certain value (when the value of feedback signal VFB is larger than a predetermined value), light load judging section 20 orders a fixed frequency for the PWM control. When light load judging section 20 judges that the load is light, light load judging section 20 orders a lower frequency as the load becomes lighter. Clock CLK1 outputted from oscillator 30 is fed to pulse width selector 10.

Feedback signal VFB is fed to load detector circuit 40 that detects an overload including the start and short-circuiting of the load, and to PWM comparator 50. Load detector circuit 40 compares feedback signal VFB with a reference value for judging an overloaded state. Load detector circuit 40 judges that an overloaded state is caused, when feedback signal VFB is higher than the reference value. Load detector circuit 40 feeds the data concerning the overloaded state as overload signal OL to pulse width selector 10. (Overload signal OL is H when an overloaded state is caused and L when any overloaded state is not caused.) Pulse width selector 10 is a circuit triggered by clock signal CLK1 to generate three kinds of ON-widths (the periods for which the signal value is H). One of the three-kinds of signals having the respective ON-widths is selected based on overload signal OL and signal plsw and outputted as ON-width signal PWon. ON-width signal PWon is fed to or-gate OR1 and set-terminal S of RS flip-flop FF2.

PWM comparator 50 is a circuit for determining the end of the ON-period of the switching device in the PWM control thereof. PWM comparator 50 compares feedback signal VFB with a triangular wave or a saw-tooth wave and resets RS flip-flop FF2 when feedback signal VFB is equal to the triangular wave or the saw-tooth wave (voltage mode). Alternatively, PWM comparator 50 compares feedback signal VFB with the voltage of current sensing terminal IS of switching control circuit 100. At the time point, at which feedback signal VFB and the voltage of current sensing terminal IS become equal to each other, PWM comparator 50 resets RS flip-flop FF2 (current mode). The period, for which Q-output Q from RS flip-flop FF2 is H, is a period where the switching device is made to be ON in the PWM control. The ON-period defined as described above becomes longer as the load becomes heavier. The ON-period defined as described above becomes shorter as the load becomes lighter. The logic AND of Q-output Q from RS flip-flop FF2 and overload signal OL inverted by inverter INV is calculated in and-gate AND and fed to or-gate OR1.

When any overloaded state is not caused (when overload signal OL is L), or-gate OR1 transmits any of Q-output Q of RS flip-flop FF2 and ON-width signal PWon having a longer width to output section 60. In the overloaded state (when overload signal OL is H), or-gate OR1 transmits ON-width signal PWon to output section 60. The ON-width T1 of ON-width signal PWon, transmitted when overload signal OL is H, is the shortest as described later. Since the ON-period determined by PWM comparator 50 is longer than the ON-period based on ON-width signal PWon in the ordinary PWM control, Q-output Q of RS flip-flop FF2 is transmitted to output section 60.

Under a light load, under which a PFM control is conducted, the ON-period determined by PWM comparator 50 is short and the ON-period based on ON-width signal PWon is long. Therefore, ON-width signal PWon is transmitted to output section 60. Based on the input of ON-width signal PWon, output section 60 outputs, via output terminal OUT, a signal for conducting the ON and OFF drive of power MOS transistor Q1.

In the following, how the switching control circuit having the configuration described above judges whether AC power supply AP1 is a high voltage system (AC 200 V) or a low voltage system (AC 100 V) and how the switching control circuit determines the ON-period of the switching device from the voltage system data and overload signal OL including the data concerning the state of overload will be described.

Figure 2A:
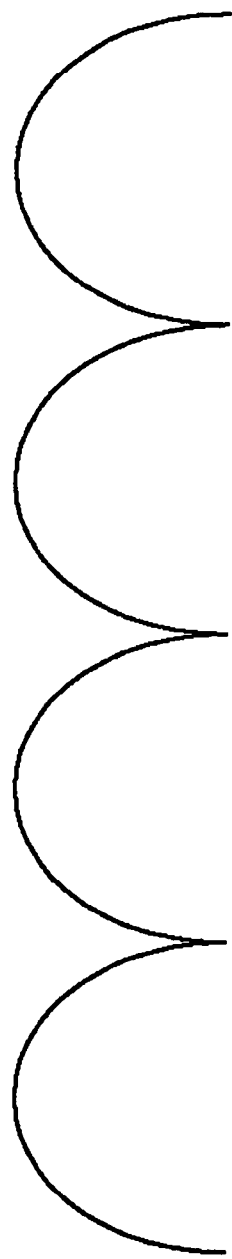
FIG. 2($a$) is a wave chart describing a waveform of the voltage obtained by the full-wave rectification of the output from an AC power supply, and FIG. 2($b$) is a wave chart describing the waveform of the voltage obtained by the half-wave rectification of the output from the AC power supply.
Figure 2B:
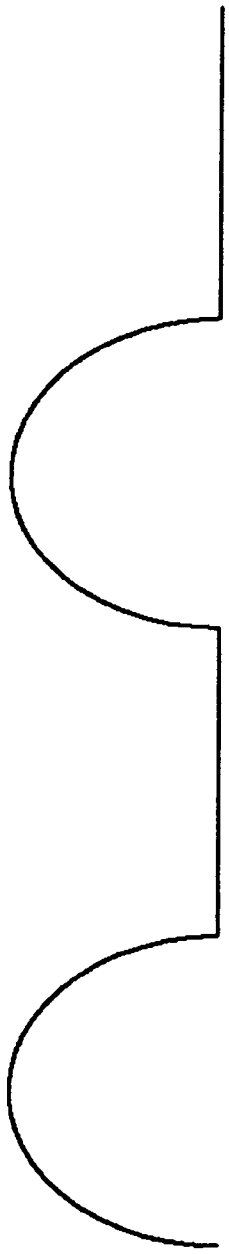

Whether AC power supply AP1 is the high voltage system or the low voltage system is judged by hysteresis comparators CMP1 and CMP2 and D-flip-flop FF1. When AC power supply AP1 is the high voltage system (AC 200 V), the peak of pulsating rectified voltage Vvh shown in FIGS. 2(a), 2(b) is higher than 220 Vdc and the peak of divided voltage signal Vvhd is higher than 2.20 V. Therefore, output signal DATA from hysteresis comparator CMP2 is in the H-state thereof around the peak of pulsating rectified voltage Vvh and the H-state is held until divided voltage signal Vvhd decreases below 0.70V, that is until rectified voltage Vvh decreases below 70 Vdc. As rectified voltage Vvh and divided voltage signal Vvhd, decreasing after exceeding the respective peaks thereof, further decreases below 100 Vdc and 1.00 V, respectively, output signal CLK2 from hysteresis comparator CMP1 is brought into the H-state thereof. At the timing, at which output signal CLK2 is brought into the H-state thereof, output signal DATA, in the H-state thereof, from hysteresis comparator CMP2 is read into D-flip-flop FF1. As divided voltage signal Vvhd further decreases below 0.70 V, output signal DATA from hysteresis comparator CMP2 is brought into the L-state thereof.

When AC power supply AP1 belongs to the low voltage system (AC 100 V), the peak of pulsating rectified voltage Vvh shown in FIGS. 2(a), 2(b) is 144 Vdc at the highest and divided voltage signal Vvhd never exceeds 2.20 V to the higher side. Therefore, output signal DATA from hysteresis comparator CMP2 is always in the L-state thereof.

In short, an H-signal is read into D-flip-flop FF1, when AC power supply AP1 belongs to the high voltage system (AC 200 V). When AC power supply AP1 is the low voltage system (AC 100 V), an L-signal is read into D-flip-flop FF1. Therefore, signal plsw, that is the Q-output from D-flip-flop FF1 and in the H-state thereof, implies that AC power supply AP1 is the high voltage system (AC 200 V). Signal plsw in the L-state thereof implies that AC power supply AP1 is the low voltage system (AC 100 V).

Figure 3:
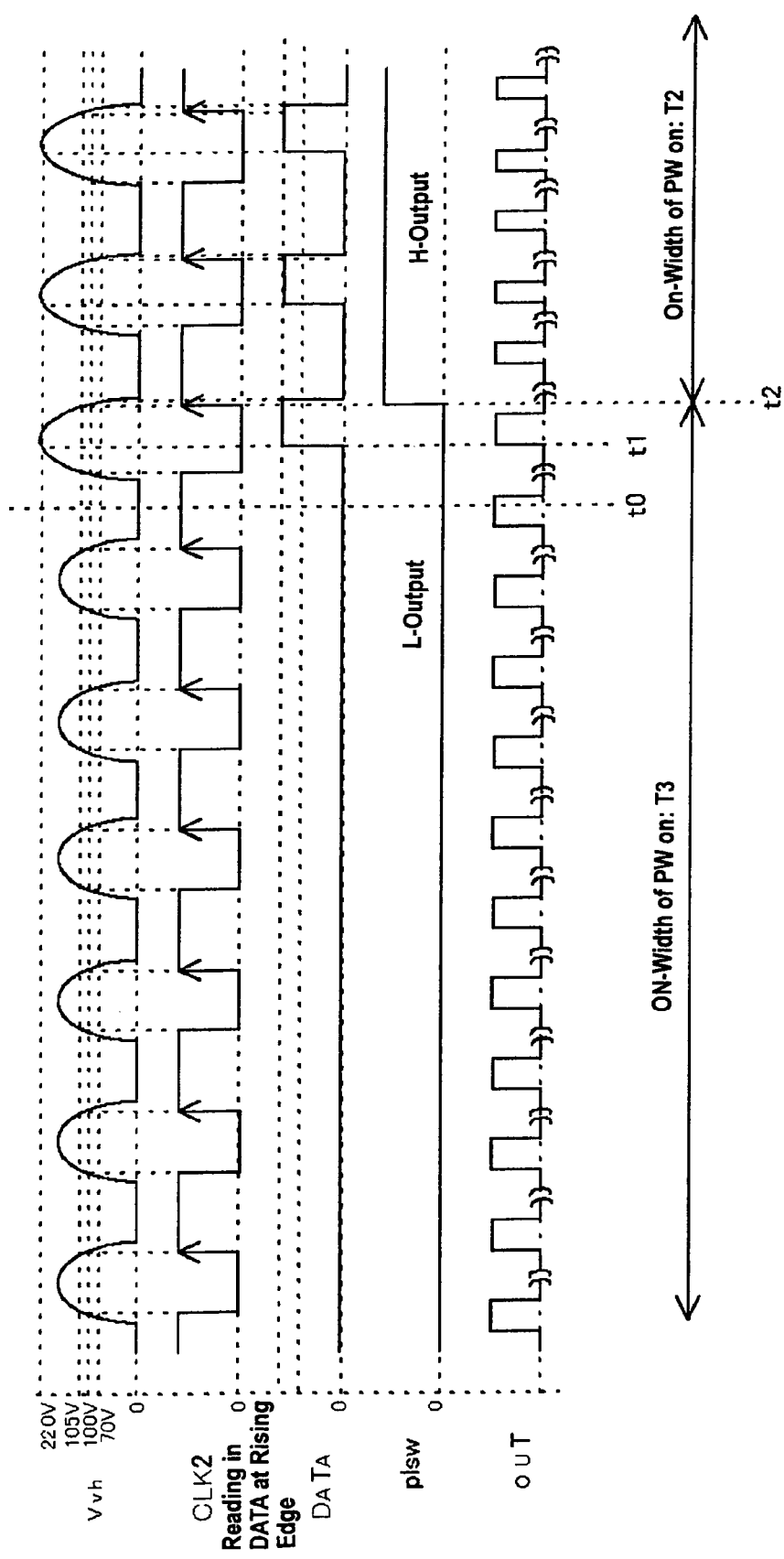
FIG. 3 is a timing chart describing how the transition of the AC power supply from a low voltage system (AC 100 V) to a high voltage system (AC 200 V) is judged.

An example of the operations described above is described in the timing chart in FIG. 3. FIG. 3 is a timing chart describing how the transition of AC power supply AP1 from the low voltage system (AC 100 V) to the high voltage system (AC 200 V) is judged.

In FIG. 3, rectified voltage Vvh fed to VH terminal VH never exceeds 220 V to the higher side and output signal DATA from hysteresis comparator CMP2 stays in the L-state thereof until the time t0, since AC power supply AP1 is the low voltage system (AC 100 V) until the time t0. Since AC power supply AP1 shifts from the low voltage system (AC 100 V) to the high voltage system (AC 200 V) beyond the time t0, output signal DATA from hysteresis comparator CMP2 is brought from the L-state into the H-state thereof at the time t1. As rectified voltage Vvh falls to 100 V at the time t2, output signal CLK2 from hysteresis comparator CMP1 is brought into the H-state thereof, output signal DATA in the H-state thereof from hysteresis comparator CMP2 is read into D-flipflop FF1, and signal plsw that is the Q-output from D-flip-flop FF1 is brought into the H-state thereof. As long as AC power supply AP1 continues to be the high voltage system (AC 200 V) hereafter, signal DATA is always H, when signal CLK2 is H, and signal plsw keeps the H-state thereof.

Pulse width selector 10 changes over, as described below, three kinds of pulse widths based on overload signal OL and signal plsw to output ON-width signal PWon. When overload signal OL is H, indicating the overloaded state, pulse width selector 10 selects the shortest pulse width T1. Even in the overloaded state, pulse width T1 is used not for interrupting the output of the switching power supply completely but for feeding the minimum electric power to the load. Since the effect of preventing an overcurrent is reduced when pulse width T1 is too long, it is necessary to set pulse width T1 to be as short as possible.

When overload signal OL is L, indicating a not-overloaded state, a pulse width is selected based on signal plsw. When signal plsw is H, that is when AC power supply AP1 is the high voltage system (AC 200 V), a middle pulse width T2 is selected. When signal plsw is L, that is when AC power supply AP1 is the low voltage system (AC 100 V), the longest pulse width T3 is selected.

Figure 4:
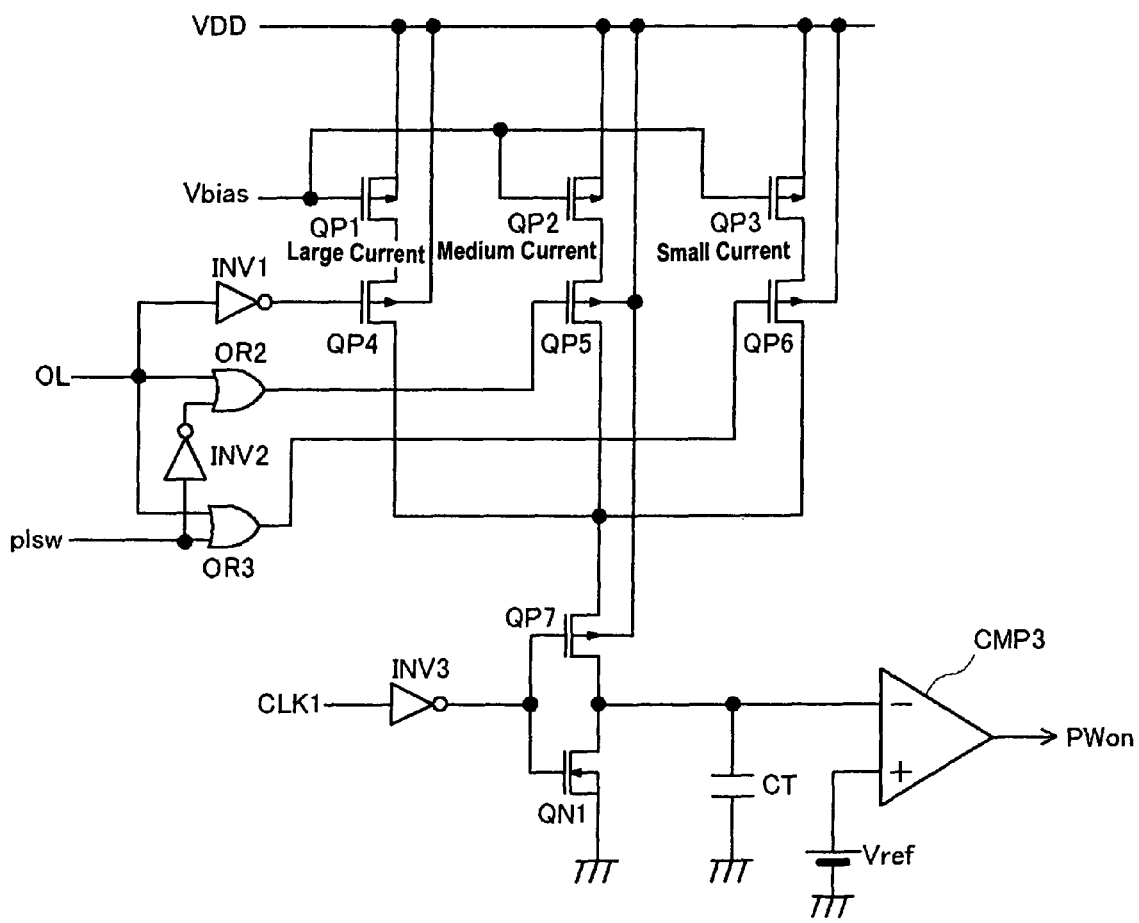
FIG. 4 is a block circuit diagram showing the configuration of a pulse width selector.

FIG. 4 is a block circuit diagram showing the configuration of pulse width selector 10.

The selector circuit shown in FIG. 4 includes P-channel MOS transistors QP1, QP2, QP3, QP4, QP5, QP6, and QP7; N-channel MOS transistor QN1; inverters INV1, INV2, and INV3; or-gates OR2 and OR3; capacitor CT; reference voltage supply Vref (the output voltage thereof will be referred to also as "output voltage Vref"); and comparator CMP3.

The currents flowing through P-channel MOS transistors QP1, QP2 and QP3 are controlled with bias voltage Vbias fed commonly to the respective gates of P-channel MOS transistors QP1, QP2 and QP3. The respective gate widths and the respective gate lengths of P-channel MOS transistors QP1, QP2 and QP3 are set such that the W/L (gate width/gate length) of P-channel MOS transistor QP1>the W/L (gate width/gate length) of P-channel MOS transistor QP2>the W/L (gate width/gate length) of P-channel MOS transistor QP3. Therefore, the respective currents flowing through P-channel MOS transistors QP1, QP2 and QP3 are set such that the current flowing through P-channel MOS transistor QP1>the current flowing through P-channel MOS transistor QP2>the current flowing through P-channel MOS transistor QP3.

Transistors QP4, QP5 and QP6 are switches that control whether the currents flowing through transistors QP1, QP2 and QP3 are made to flow to the circuit in the succeeding stage or not. Transistor QP4 is controlled by the output from inverter INV1. Transistor QP5 is controlled by the output from or-gate OR2. Transistor QP6 is controlled by the output from or-gate OR3.

Inverter INV1, inverter INV2, or-gate OR2, and or-gate OR3 constitute a logic circuit that determines the ON and OFF of transistors QP4 and QP5 based on signals plsw and OL. When signal OL is H and the output from inverter INV1 is L, the outputs from or-gates OR2 and OR3 are H. Therefore, transistor QP1 is brought into the ON-state thereof and transistors QP5 and QP6 are brought into the respective OFF-states. In this case, only the current flowing through transistor QP1 flows to the circuit in the succeeding stage.

When signal OL is L, transistor PQ4 is in the OFF-state thereof. If signal plsw is H in this case, the output from or-gate OR2 will be L and the output from or-gate OR3 will be H, bringing transistor QP5 into the ON-state thereof and transistor QP6 into the OFF-state thereof. The current flowing through transistor QP2 flows to the circuit in the succeeding stage. If signal plsw is L when signal OL is L, the current flowing through transistor QP3 will flow to the circuit in the succeeding stage in the same manner as described above.

Any of transistors PQ1 through QP3 selected by signals OL and plsw is connected to transistor QP7. Signal CLK1 inverted by inverter INV3 is applied to the gates of transistors QP7 and QN1. When signal CLK1 is L, transistor QP7 is OFF and transistor QN1 is ON, discharging capacitor CT until the voltage across capacitor CT becomes zero.

When signal CLK1 is brought into the H-state thereof, transistor QP7 is brought into the ON-state thereof and transistor QN1 into the OFF-state thereof. The current flowing through any of transistors PQ1 through QP3 selected by signals OL and plsw charges capacitor CT. As the voltage across capacitor CT reaches reference voltage Vref, output signal PWon from comparator CMP3 is inverted from the H-state to the L-state.

If the period, for which signal CLK1 is H, is very short, the H-period, for which output signal PWon is H, is the period, for which the voltage across capacitor CT is increased from zero to reference voltage Vref by charging capacitor CT with the current flowing through transistor PQ7. Since the H-period is inversely proportional to the current value flowing through transistor PQ7, the H-period provides the shortest pulse width T1 when transistor QP1 is selected by signals OL and plsw. When transistor QP2 is selected, pulse width T2 is obtained. When transistor QP3 is selected, pulse width T3 is obtained. Thus, the operations of pulse width selector 10 described with reference to FIG. 4 are realized.

The disclosure of Japanese Patent Application No. 2008-229239, filed on Sep. 8, 2008, is incorporated in the application.

While the invention has been explained with reference to the specific embodiments of the invention, the explanation is illustrative and the invention is limited only by the appended claims.

What is claimed is:

1. A switching power supply apparatus inputting a voltage obtained by rectifying an output from an AC power supply, as an input thereof, comprising:
   a switching control circuit for conducting a PFM control having a fixed ON-period of a switching device when a load is judged to be light based on a load signal indicating the load, and a PWM control when the load is judged not to be light,
   wherein the switching control circuit changes the ON-period based on whether the AC power supply is a high voltage system or a low voltage system.

2. The switching power supply apparatus according to claim 1, further comprising a hysteresis comparator for comparing a pulsating voltage of the AC power supply with a first reference voltage and a second reference voltage lower than the first reference voltage, respectively, wherein the switching control circuit judges whether the AC power supply is the high voltage system or the low voltage system based on an output outputted from the hysteresis comparator when the pulsating voltage decreasing from a voltage value higher than a third reference voltage between the first and second reference voltages becomes equal to the third reference voltage.

3. The switching power supply apparatus according to claim 1, wherein the switching control circuit sets the ON-period of the switching device at a predetermined shortest ON-period when a predetermined condition is met during the PWM control.

4. The switching power supply apparatus according to claim 3, wherein the shortest ON-period is shorter than the ON-period of the switching device during the PFM control.

5. The switching power supply apparatus according to claim 3, wherein the predetermined condition comprises a condition that the load judged from the load signal is equal to or greater than a rated load.

6. The switching power supply apparatus according to claim 1, wherein the load signal comprises an error signal indicating a difference between a detected output voltage outputted from the switching power supply apparatus and a reference value thereof.

7. The switching power supply apparatus according to claim 1, wherein the load signal comprises a detection signal indicating a current flowing through the switching device.

* * * * *